Dec. 24, 1940.     C. O. J. MONTELIUS     2,225,880
VALVE
Filed Oct. 1, 1938
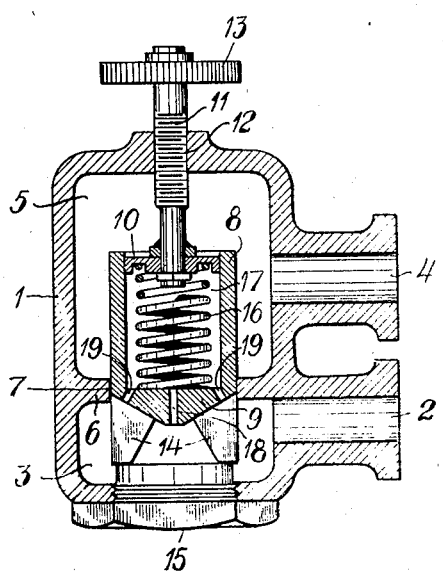
INVENTOR:
CARL OSCAR JOSEF MONTELIUS
BY Hartline, Lake & Co
ATTORNEYS Patented Dec. 24, 1940

2,225,880

UNITED STATES PATENT OFFICE 2,225,880

VALVE

Carl Oscar Josef Montelius, Stockholm, Sweden, assignor to Aktiebolaget Imo-Industri, Stockholm, Sweden, a corporation of Sweden Application October 1, 1938, Serial No. 232,828
In Sweden June 30, 1937

2 Claims. (Cl. 137—53)

This invention relates to valves for controlling liquids and gases.

In active operation of valves for liquids and gases, static forces arise from the effect of the pressure of the fluid against the valve body while on the other hand, dynamic forces arise from the flow of the fluid. In manually operable valves forces oppose the setting of the valve in one direction of movement only, and in automatically operating spring or weight-actuated valves the dynamic forces make it necessary that in order fully to open the valve, a certain increase of pressure is required for operation which often is very considerable as compared with the pressure at which the valve is set to begin to open.

In order to reduce the forces acting on said spring it has already been proposed to partly balance the dynamic, for instance hydraulic, forces acting on the bottom of the valve body by utilizing a counteracting secondary piston which, together with the interior of the valve body, forms a closed chamber. When the fluid is passing through the opened valve the dynamic forces will cause a change of the pressure conditions on the bottom of the valve body, and, therefore, the balance will be disturbed.

Relief valves are already known in the art having a seat for the valve body to utilize means for reducing the pressure within the closed chamber when the valve is raised from its seat. It is further known in the valve art to arrange passages in a valve head, whereby pressure on the back of the valve head is rendered less than that on the front in order to enable the valve to remain open despite a reduction in the pumping pressure.

The present invention refers to such valves in which the valve body instead of cooperating with a seat consists of a plunger or piston slidable in an opening in a wall separating the inlet from the outlet.

The valve according to the present invention comprises a casing having an inlet chamber and an outlet chamber, a wall separating said two chambers, an opening in said wall, a hollow piston valve member having a bottom and slidably fitting in said opening, a guiding means for the hollow piston member having a diameter less than the diameter of the piston and arranged to form a closed chamber together with the interior of the hollow piston member, a biasing means to act upon said hollow valve member, means for adjusting the tension of said biasing means, one or more passageways through the bottom of the valve member opening at such place of the exterior surface of the bottom that the pressure in the chamber within the hollow piston is at least substantially equal to the average pressure on the said exterior surface even when the valve is opened.

The invention will be more fully described with reference to an embodiment of the same shown by way of an example only on the accompanying drawing which shows a longitudinal sectional view.

The valve as illustrated is intended to open at a given pressure. The valve casing 1 has an inlet connecting branch 2 leading to a pressure space 3 within the casing and an outlet connecting branch 4 leading to another space 5 within the casing. The spaces 3 and 5 are separated from each other by means of a wall 6 having an opening 7 which is controlled by a piston valve 8. The valve body consists of a hollow cylindrical part 8 integral at one end with a bottom 9. Within the cylindrical part is a secondary piston 10 which is adjustable by means of a screw 11 engaging a thread 12 in the casing 1, screw 11 being provided with a hand-wheel 13. The external side of the bottom 9 of the valve is fitted with wings 14 which in closed position of the piston valve rest against a nut 15 inserted in an opening in the bottom of the pressure space 3. A biasing spring 16 provided within the chamber 17 between the bottom 9 of the valve cylinder 8 and the secondary piston 10 tends to retain the valve in closed position. In the bottom 9 of the valve cylinder are provided a central channel 18 and two or more peripheral channels 19, said channels connecting the chamber 17 with the pressure space 3.

The operation of the valve is as follows:

When the valve is closed as illustrated the same pressure prevails in the space 3 and the chamber 17. The pressure in space 3 acts on the external surface of the bottom 9 of the valve body and that in the chamber 17 on piston 10 and on the internal surface of the bottom 9 which surface has a smaller cross-sectional area than the external surface thereof. At a given predetermined overpressure in space 3 the tension of the biasing spring 16 is overcome causing the valve to open. Due to the flow of the fluid from pressure space 3 into space 5 a pressure fall will occur at the place of the narrowest passage of the valve. This pressure fall is transmitted through the channels 19 to the chamber 17 causing a certain amount of fluid to flow from said chamber 17 into the pressure space 3 through the channels 18 and 19, whereby the pressure in chamber 17 becomes lower than that in the pressure space 3. By suitably adapting the cross-sectional areas of the channels 18 and 19 it is possible to create a pressure fall in chamber 17 corresponding to the pressure fall on the external side of the bottom of the piston valve caused by the flow of the fluid, so that the over-pressure in the pressure space 3 in relation to the pressure in space 5 will be unchanged in all positions of the valve.

Obviously, the initial pressure at which the valve shall open may be varied by adjusting the piston 10 by means of the hand-wheel 13.

What I claim is:

1. A valve for controlling liquids and gases comprising a casing having an inlet chamber and an outlet chamber, a wall separating said two chambers, an opening in said wall, a hollow piston valve member having a bottom and slidably fitting in said opening, a guiding means for the hollow piston valve member having a diameter less than the diameter of the piston valve member and arranged to form a closed chamber together with the interior of the hollow piston valve member, a biasing means to act upon said hollow valve member, means for adjusting the tension of said biasing means, one or more passageways through the bottom of the piston valve member opening at such place of the exterior surface of the bottom that the pressure in the chamber within the hollow piston valve member is at least substantially equal to the average pressure on the said exterior surface even when the valve member is opened.

2. A valve for controlling liquids and gases comprising a casing having an inlet chamber and an outlet chamber, a wall separating said two chambers, an opening in said wall, a hollow piston valve member having a bottom and slidably fitting in said opening, a guiding means for the hollow piston valve member having a diameter less than the diameter of the piston valve member and arranged to form a closed chamber together with the interior of the hollow piston valve member, a biasing means to act upon said hollow valve member, means for adjusting the tension of said biasing means, one or more passageways through said bottom at or near the centre thereof, and two or more passageways through the bottom near the edge of the valve member.

CARL OSCAR JOSEF MONTELIUS.